US009443375B2

(12) United States Patent
Okada

(10) Patent No.: US 9,443,375 B2
(45) Date of Patent: *Sep. 13, 2016

(54) GAMING MACHINE

(71) Applicants: UNIVERSAL ENTERTAINMENT CORPORATION, Koto-Ku, Tokyo (JP); ARUZE GAMING AMERICA, INC., Las Vegas, NV (US)

(72) Inventor: Kazuo Okada, Tokyo (JP)

(73) Assignees: UNIVERSAL ENTERTAINMENT CORPORATION, Tokyo (JP); ARUZE GAMING AMERICA, INC., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/467,670

(22) Filed: Aug. 25, 2014

(65) Prior Publication Data

US 2015/0045107 A1 Feb. 12, 2015

Related U.S. Application Data

(63) Continuation of application No. 13/151,810, filed on Jun. 2, 2011, now Pat. No. 8,834,252.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |
| ***G07F 17/34*** | (2006.01) |

(52) U.S. Cl.
CPC ........... *G07F 17/3213* (2013.01); *G07F 17/34* (2013.01)

(58) Field of Classification Search
USPC ...................... 463/16, 20, 25, 27, 30, 40, 42
See application file for complete search history.

(56) References Cited

U.S. PATENT DOCUMENTS

| | | | | |
|---|---|---|---|---|
| 6,422,940 | B1 | 7/2002 | Walker et al. | |
| 6,609,972 | B2 * | 8/2003 | Seelig | G07F 17/32 273/138.1 |
| 7,479,061 | B2 | 1/2009 | Okada | |
| 2007/0225061 | A1 | 9/2007 | Naobayashi | |
| 2007/0232390 | A1 | 10/2007 | Sato | |
| 2009/0191942 | A1 * | 7/2009 | Bennett | 463/20 |
| 2009/0227376 | A1 * | 9/2009 | Oomori | 463/41 |
| 2011/0230262 | A1 * | 9/2011 | Shan | 463/30 |

FOREIGN PATENT DOCUMENTS

| | | |
|---|---|---|
| JP | 2005-323767 | 11/2005 |

* cited by examiner

*Primary Examiner* — Adetokunbo O Torimiro
(74) *Attorney, Agent, or Firm* — KMF Patent Services, PLLC; Kenneth M. Fagin, Esq.; S. Peter Konzel, Esq.

(57) ABSTRACT

The present invention provides players with fun brought by a moveable component. A gaming machine includes a game result determination unit, that determines a game result; a game execution unit, that executes a game in such a manner as to reach the game result; a moveable component, disposed at a position visible from outside and configured to be capable of mechanical movement; and a movement control unit, which enables the moveable component to move in a movement pattern corresponding to the game result.

4 Claims, 12 Drawing Sheets

GAMING MACHINE

CROSS-REFERENCE TO RELATED APPLICATIONS

This application is a continuation of, and claims the priority benefit of, application Ser. No. 13/151,810 filed Jun. 2, 2011, the contents of which are incorporated herein by reference.

BACKGROUND OF THE INVENTION

1. Field of the Invention

The present invention relates to a gaming machine providing better entertainment through a dynamic physical movement performance according to a game result in the period after a game is executed and before the game result is displayed.

2. Description of the Prior Art

In prior art, for example, U.S. Pat. No. 7,479,061 discloses inserting a magnifying lens in front of mechanical reels to scale up display of symbols of the reels. Japanese Laid-open Patent Publication No. 2005-323767 discloses a gaming machine which can provide a performance associated with the game by using the electric discharge phenomenon.

SUMMARY OF THE INVENTION

Currently, the technology of dynamically enabling physical objects (referred to as moveable component hereinafter) to move on the basis of the game result in the period from the input with the spin button to the display of the game result as the reels stop does not exist in a gaming machine such as a slot machine. Besides, a player is unable to predict a game result during the process of executing the game and has to wait until the game result is given.

The present invention is developed by focusing on the problem, and the objective thereof is to provide a player with not only the analog amusement brought by mechanical movement of a moveable component corresponding to the game result during the process of executing the game, but also the fun of predicting the game result performed to the player in a comprehensible movement pattern.

The present invention provides a gaming machine, which comprises: a game result determination unit, determining a game result; a game execution unit, executing a game in a manner of reaching the game result; a moveable component, disposed at a position visible from outside, and configured to be capable of mechanical movement; and a movement control unit, during the process of executing the game, enabling the moveable component to move in a movement pattern corresponding to the game result.

According to the present invention, during the process of executing the game, by enabling the player to see the movement pattern of the moveable component, not only the analog amusement brought by the mechanical movement of the moveable component but also the fun of predicting a game result are provided to the player.

The movement control unit of the present invention starts the movement of the moveable component when at least one of predetermined triggering conditions related to the game is satisfied.

According to the present invention, as the moveable component only moves when certain conditions are satisfied, compared with the moveable component that keeps moving during each game, the fun of expecting the moveable component to move can be provided to the player.

The present invention further comprises a movement pattern setting unit setting the movement pattern in a changeable manner through an external operation.

According to the present invention, as the movement pattern of the moveable component can be changed on the basis of the intention of the player, the moveable component may move in a movement pattern apparent to the player, for example, when the game in which the game result expected by the player is reached is being executed. Therefore, the player can easily predict a game result.

The movement control unit of the present invention enables the moveable component to move in such a manner that the moveable component indicates the game result after the game is executed.

According to the present invention, the game result can be indicated by the moveable component, so as to provide the fun of visual confirmation of the game result by viewing the moveable component.

The game execution unit of the present invention executes a slot game which changeably displays symbols and obtains a game result.

[Effect of the Invention]

The present invention can provide the player with not only the analog amusement brought by the mechanical movement of the moveable component, but also the fun of predicting the game result.

DETAILED DESCRIPTION (General Description of Gaming Machine)

The embodiments of the present invention are illustrated below with reference to the drawings. The embodiments of the gaming machine described below are about gaming machines capable of executing battle game between gaming terminals, but the present invention is not limited thereto.

Figure 1:
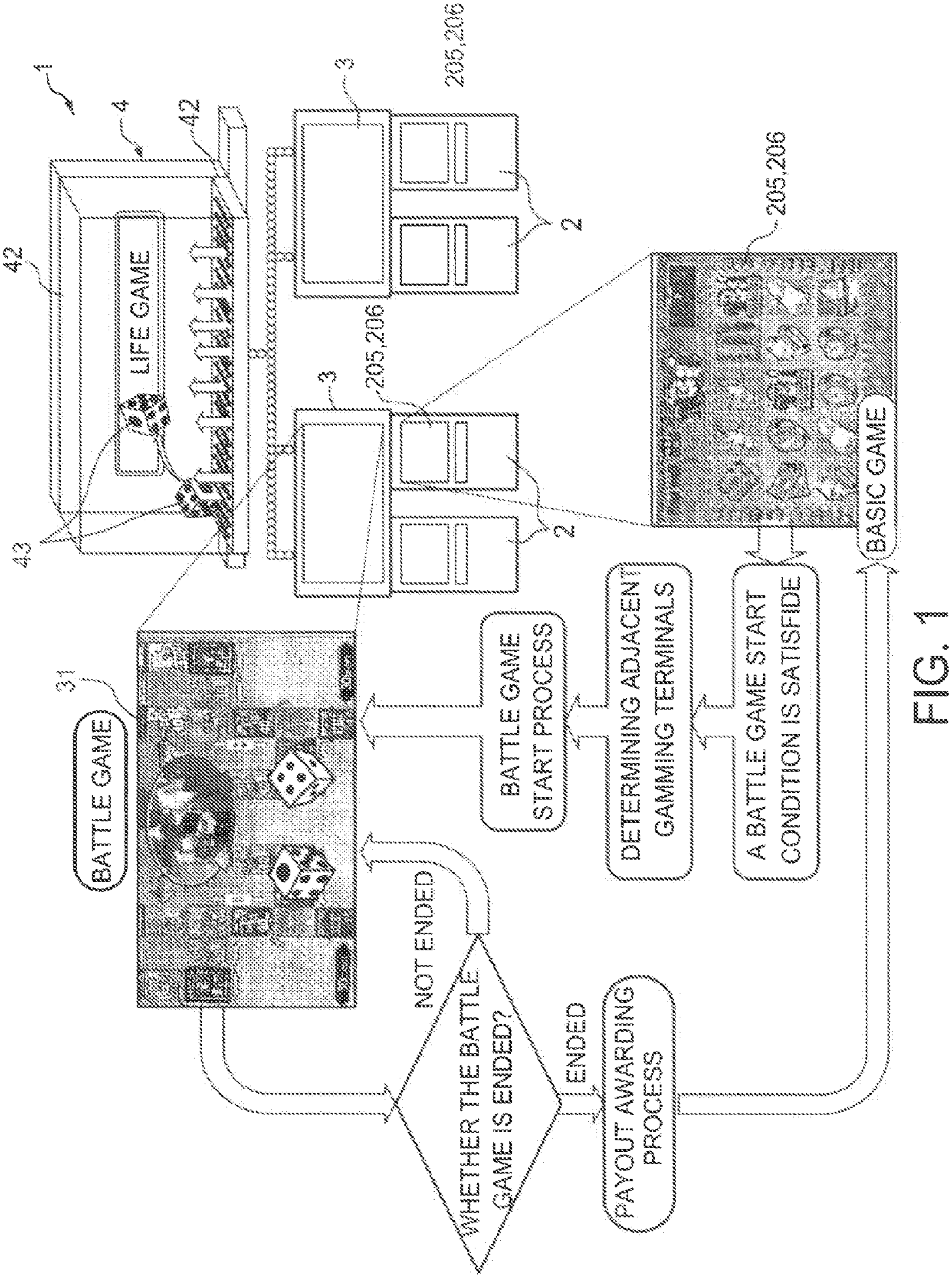
FIG. 1 is an explanatory diagram illustrating a gaming method of a gaming machine.

As shown in FIG. 1, in an embodiment, during execution of a basic game, if a battle game start condition is satisfied, the gaming machine 1 determines adjacent gaming terminals, i.e., slot machines 2, and executes a battle game start process. Further, the present invention is structured to make possible a battle game in which adjacent gaming terminals compete with each other to win, and the battle game is repeatedly executed until the battle game is won, and some profits are distributed to the winning slot machine 2. Although in this embodiment the slot machine 2 is described as a gaming terminal, the present invention is not limited thereto.

(General Description of Gaming Machine: Functional flow)

Figure 2:
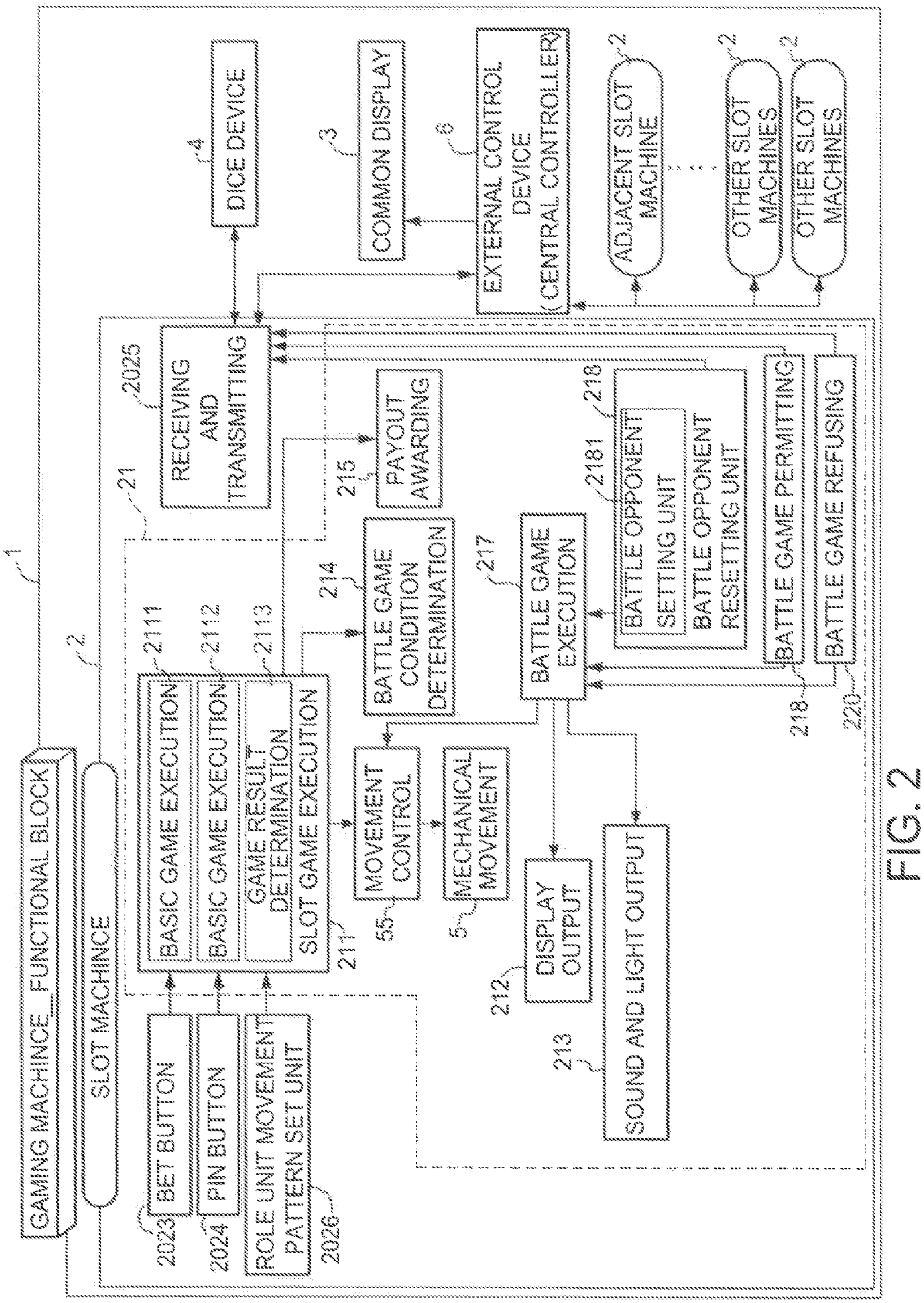
FIG. 2 is an explanatory diagram illustrating a functional flow of a gaming machine.

Specifically, as shown in FIG. 2, the gaming machine 1 is structured for multiple players, and multiple slot machines 2 are connected to a central controller 6 (external control device) in a manner capable of data communication therebetween, and the slot machines 2 are connected in a manner capable of data communication with each other. The central controller 6 has functions of remote operation and remote monitoring of processing such as modification of operation status of the slot machines 2 or various game setting values. Further, the gaming machine 1 can execute a basic game such as a slot game separately in each slot machine 2, and execute a battle game such as a life game at the same time between adjacent slot machines 2·2.

In addition, the connection between the slot machines 2 or the connection between the slot machines 2 and the central controller 6 can be either wired or wireless, and can also be a combination of wired and wireless connection. Also, in the slot game or battle game, a unit of a bet amount may be a national or regional currency such as the US dollar, the Japanese Yen and the Euro, or a game point passable only at a hall where the gaming machine 1 is installed or an industry related to the gaming machine 1.

Further, the gaming machine 1 includes a dice device 4 and a common display 3. The dice device 4 is structured to cast a physical dice 43 to make the physical dice 43 roll randomly, and is capable of telling the score of the dice 43 when it stops. One common display 3 is disposed for 2 slot machines 2·2 arranged in parallel. The detailed description of the dice device 4 and the common display 3 will be provided later.

The slot machine 2 comprises a terminal controller 21, a BET button 2023 connected to the terminal controller 21, a spin button 2024, a receiving and transmitting unit 2025, and an role unit movement pattern set unit 2026 for setting a movement pattern of a role unit 5 through an external operation. Accordingly, the gaming machine 1 can select one movement pattern from a plurality of preprogrammed movement patterns according to the intention of the player, so more enhanced amusement effects of the game can be provided. Further, the slot machine 2 has a sound and light output unit 213, a display output unit 212, and a role unit 5. The sound and light output unit 213 has a function of driving a speaker or a lamp and the like to provide sound and/or light effects. The display output unit 212 has a function of screen display of a variety of display data on a display panel. The role unit 5 has a function of providing a mechanical movement of a predetermined moveable component 51.

The terminal controller 21 comprises a slot game execution unit 211 and a movement control unit 55. The slot game execution unit 211 has a basic game execution unit 2111, a bonus game execution unit 2112, and a game result determination unit 2113. The basic game execution unit 2111 has a function of executing a basic game. The bonus game execution unit 2112 has a function of executing a bonus game. The game result determination unit 2113 determines a game result during the execution of those game. The movement control unit 55 has a function of executing a role unit movement process to activate the movement of a predetermined moveable component to move in predetermined movement pattern according to game result during the execution of the game. In other embodiments, The movement control unit 55 activates the role unit movement process when predetermined triggering condition is satisfied.

Here, the "basic game" refers to a game executed with a bet of a game value as a condition and awarding game values of amounts corresponding to rearranged symbols 101. That is to say, the so-called "basic game" refers to a game which is executed on the premise of consuming game values. The so-called "bonus game" has the same meaning as a special game. The bonus game may also be any game provided that bonus game has an advantageous game status over the basic game. The so-called "rearrangement" refers to a state in which the symbols 101 are arranged again after the previous arrangement of the symbols 101 is dismissed. The so-called "arrangement" refers to a state in which the symbols 101 are allowed to be visible to a player.

Further, the terminal controller 21 includes: a payout awarding unit 215, for awarding a payout on the basis of a game result of the basic game; a battle game condition determination unit 214, for determining whether a battle game condition related to the payout is at least satisfied when a game result of the basic game corresponding to the payout occurs; a battle opponent setting unit 218, for setting adjacent slot machines 2 as battle opponents when it is determined that the battle game condition is satisfied; a battle game execution unit 217, for executing the battle game that the battle opponents compete to win when the battle opponents join in the battle game; and a movement control unit 555 having the same function as the movement control unit 55.

Accordingly, in a slot machine 2 where a game result corresponding to the payout occurs in a basic game, it is determined whether a battle game condition related to the payout is at least satisfied. When it is determined that the battle game condition is satisfied, adjacent slot machines 2 are set as battle opponents.

Here, the "battle game condition" can be at least one of a condition based on a payout awarding amount, a condition based on an accumulated payout awarding amount, and a condition based on a balance amount obtained by subtracting a game fee required for executing the basic game from the payout awarding amount. Further, the "battle game condition" can be any one of direct payouts and indirect payouts as long as it is at least related to the payout. For example, the "battle game condition" can also be a case of winning a bonus or a jackpot as a game result of a basic game. At this time, as the battle game conditions can be selected in free combinations from a plurality of conditions, the battle game frequency can be easily and freely set.

Further, the battle opponent setting unit 218 in the terminal controller 21 has a battle opponent resetting unit 2181 for resetting the battle opponent to a preprogrammed computer when the battle opponent does not join the battle game. Accordingly, in the gaming machine 1, even when the battle game with the adjacent slot machines 2 is not implemented, the battle game with a computer as the battle opponent of can be executed, so as to keep the player interested.

The functional blocks of the terminal controller 21 having such a structure are implemented through information processing devices including an operation unit, a memory unit or an interface unit mounted on the circuit board. Accordingly, the terminal controller 21 has a structure programmed in a manner to execute a variety of function processes. That is to say, the terminal controller 21 of the slot machine 2 is programmed in a manner to perform the processes in Steps (a1) to (a6), so as to have the battle game executed on the adjacent slot machines 2·2. That is to say, the slot machine 2 comprises the terminal controller 21 which have the battle game executed on the adjacent slot machines 2·2. Accordingly, the slot machine 2 implements a game control method in which Steps (a1) to (a6) are performed.

In Step (a1), a basic game is executed, and the game result is determined In Step (a2), a role unit movement process is executed on the basis of a game result of the basic game. In Step (a3), a payout is awarded on the basis of a game result of the basic game. In Step (a4), when a game result of the basic game corresponding to the payout occurs, it is determined whether a battle game condition related to the payout is at least satisfied. In Step (a5), when it is determined that the battle game condition is satisfied, adjacent slot machines 2 (gaming terminals) are set as battle opponents. In Step (a6), when the battle opponents join the battle game, the battle game in which the battle opponents compete to win is executed.

(Mechanical Structure of Slot Machine 2)

Figure 3:
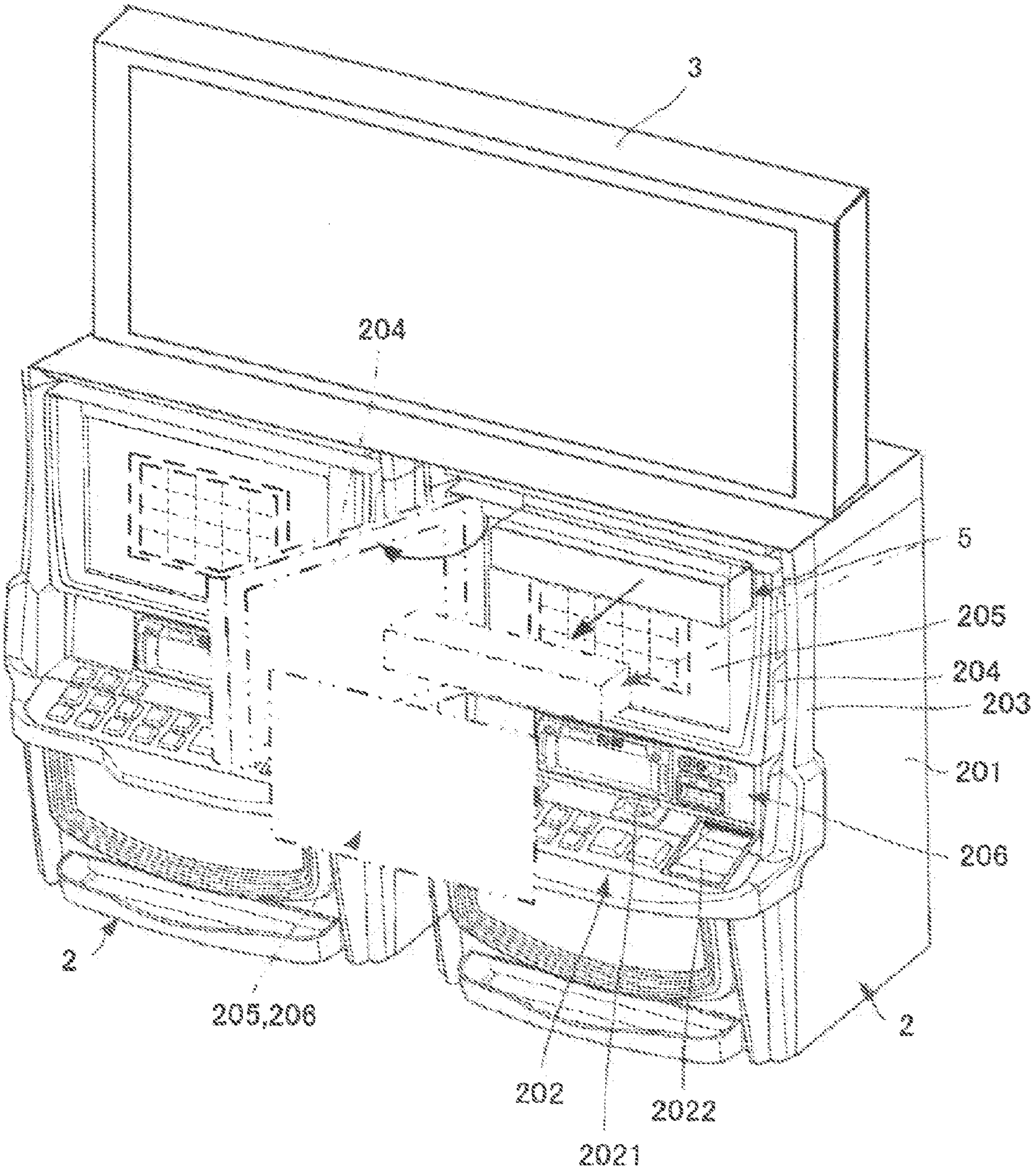
FIG. 3 is a schematic view illustrating functional flow of a gaming machine.

A slot machine 2 having a variety of the functions, as shown in FIG. 3, includes a cabinet 201, a main door 203 provided to a front of the cabinet 201, and a display door 204 disposed at an upper part of the main door 203. The display door 204 is provided with a symbol display device 205. The symbol display device 205 comprises a transparent liquid crystal panel capable of changing all or any part thereof into a transparent state.

Figure 4:
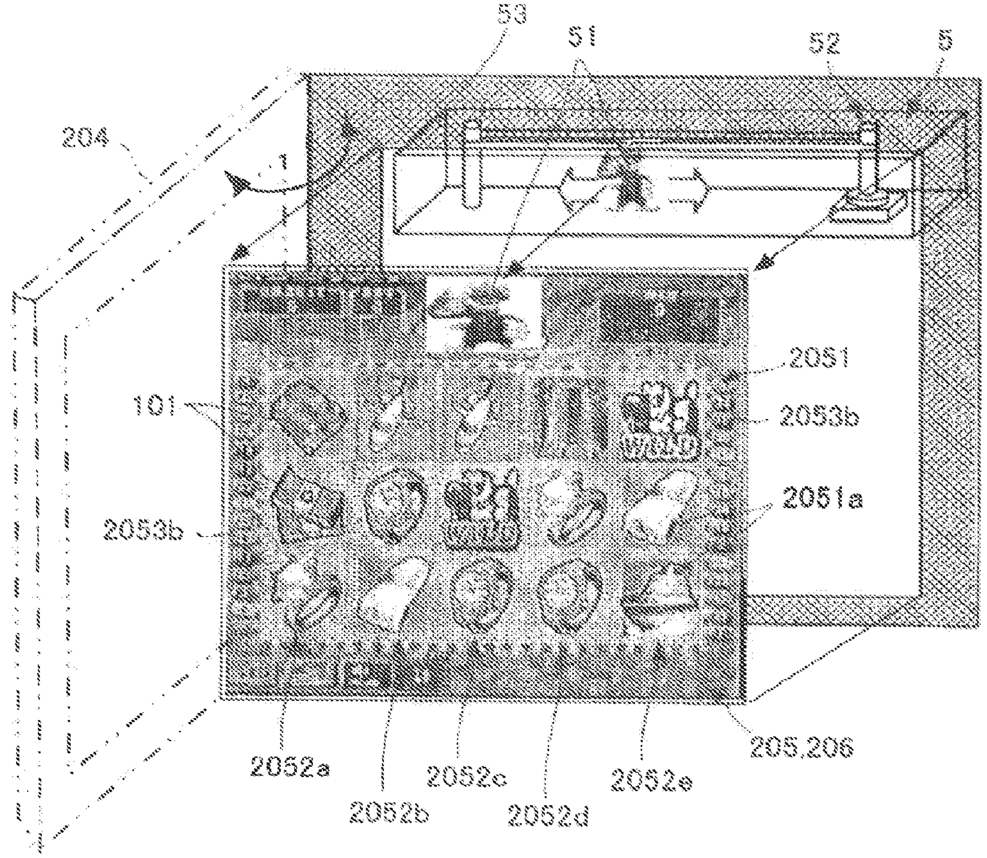
FIG. 4 is a schematic structural view of a symbol display device.

The symbol display device 205, as shown in FIG. 4, has a display window 2051 at a central part. The display window 2051 is formed of 15 display blocks 2051*a* in 5 columns and 3 rows. 3 display blocks 2051*a* in each column form virtual reels 2052*a* to 2052*e*. The virtual reels 2052*a* to 2052*e* can be rearranged as follows: the 3 display blocks 2051*a* are enabled to integrally change speeds while moving downward to be displayed, so the symbols 101 displayed in all display blocks 2051*a* stop after spinning in a vertical direction.

Further, pay line generation columns 2053*a*·2053*b* are symmetrically arranged at the left side and the right side of the display window 2051. The pay line generation columns 2053*a*·2053*b* at the two sides each have a plurality of pay line generation units. The pay line generation units at each side may together form an activated pay line. The pay lines are activated by connecting the pay line generation units at the two sides. Otherwise, the pay lines are inactived. The number of paylines L to be activated is determined based on a bet amount. In such a case where a MAXBET indicating the maximum amount of bet allowed, the maximum number of paylines L, are activated. Various winning combinations of symbols 101 are formed along activated paylines L.

On the front of the symbol display device 205, a touch panel 206 is provided. A player can input a variety of operation data through the touch panel 206. As shown in FIG. 3, below the symbol display device 205, a PTS terminal 206 and a control panel 202 are arranged in sequence.

The PTS terminal 206 is a unit comprising an LCD 2061, a microphone, or a human detection camera, and includes various devices having a microphone function or a camera function, a speaker function, and a display function. The PTS terminal 206 can receive and transmit various game related data such as credit data through mutual communication with the terminal controller 21 and a management server, which is not shown. Further, the control panel 202 has various buttons such as the BET button 2023 in FIG. 2, and has a coin insertion slot 2021 for inserting a coin into the cabinet 201 or a bill insertion slot 2022 for inserting a bill.

(Role Unit 5)

In one embodiment, the role unit 5 is disposed at a rear side of the symbol display device 205 (an internal side of the cabinet 201). As shown in FIG. 4, the role unit 5 comprises visible moveable components 51 such as 3-dimensional dummies or dolls, a movement mechanism 52 making the moveable components 51 to move left and right, and an accommodation body 53 for supporting the moveable components 51 and the movement mechanism 52 and having an opening in front. Accordingly, the moveable component 51 can be seen from outside through a transparent part of the symbol display device 205.

The role unit 5 provides a dynamic physical movement performance according to a game result in the period after a game is executed and before the game result is displayed through executing a role unit movement process. The role unit movement process activates the movement of the role unit 5 in predetermined movement pattern according to the game result. In some embodiments, in the role unit movement process it is determined whether the triggering condition is satisfied. When the triggering condition is satisfied, the movement of the role unit 5 is activated in predetermined movement pattern according to the game result and then the role unit movement process ends; otherwise, the role unit movement process ends without triggering the movement of the role unit 5. That is to say, the activation of the movement of the role unit depends on whether at least one of the triggering condition is satisfied.

The movement of the role unit 5 is associated with screen display according to predetermined triggering. There are a plurality of movement patterns preprogrammed One movement pattern is selected from the plurality of movement patterns according to the determined reel stop position, that is to say, the game result.

The movement patterns can be decided from external input unit such as the role unit movement pattern set unit 2026 for deciding the movement pattern of the moveable component 51. The moveable component 51 can move in a plurality of movement patterns according to the input pattern of the input unit. For examples, in one movement pattern, the moveable component 51 can be configured to indicate the rank in a second game when the player wins but not to notify when the player loses. In another movement pattern, the input unit can be operated to let the ball displayed by image be kicked by the moveable component 51, and the rank in the second game is displayed in response to the destination of the ball. In another movement pattern, the role unit 5 is disposed to a front of the reel, and the moveable component 51 shields predetermined symbols while the reels stop the rotation.

The moveable component 51 can be configured in a variety of forms such as dummies or dolls, two doors, vibration of touch panel, moveable liquid crystal, plasma ball and so on. In one embodiment, the role unit 5 has a plurality of dolls in different sizes or types as moveable components 51, and the predetermined moveable component 51 moves according to the movement pattern. For example, in one movement pattern, the bigger the accumulated payout amount is, the bigger the moveable component 51 which is determined to move.

The accommodation body 53 can be a detachable cabinet to be attached to and removed from cabinet 201 at will respect to one another.

The movement of the role unit 5 is triggered under the following triggering conditions, i) When the game results of mystery bonus and the like are not shown, but the prize winning and payout awarding are performed, the movement of the moveable component 51 is triggered.

ii) Predetermined moveable component 51 moves according to the types of medal, or the moveable component 51 moves in predetermined movement pattern according to the types of medal.

iii) When the value of coin per bet can be selected by player, player can select from a plurality of bet patterns, and the moveable component 51 moves only when predetermined bet pattern is selected. For examples, mystery bonus is difficult to verify by the game result shown, but when the game is executed in the bet pattern selected from a plurality of bet patterns such as MAX bet, Full-line bet, and bet of value over predetermined value, the winning of the mystery bonus is indicated by the movement of the moveable component 51.

iv) When the bet activated payline can be selected by player, the moveable component 51 moves when selected activated payline is complete.

v) The winning of the progressive jackpot can be deemed an option of the game results when the progressive jackpot is determined by the other selection, and the moveable component 51 moves according to the option selected as the game result.

vi) The game result of the second game can be deemed as option of the game result when developing from the basic game to the second game which turns to be a free game, and the moveable component 51 moves according to the option selected as the game result.

Although the triggering conditions in the embodiment of the present invention are described as above, the embodiment is only exemplary, and not intended to limit the present invention.

(Common Display 3)

Figure 5:
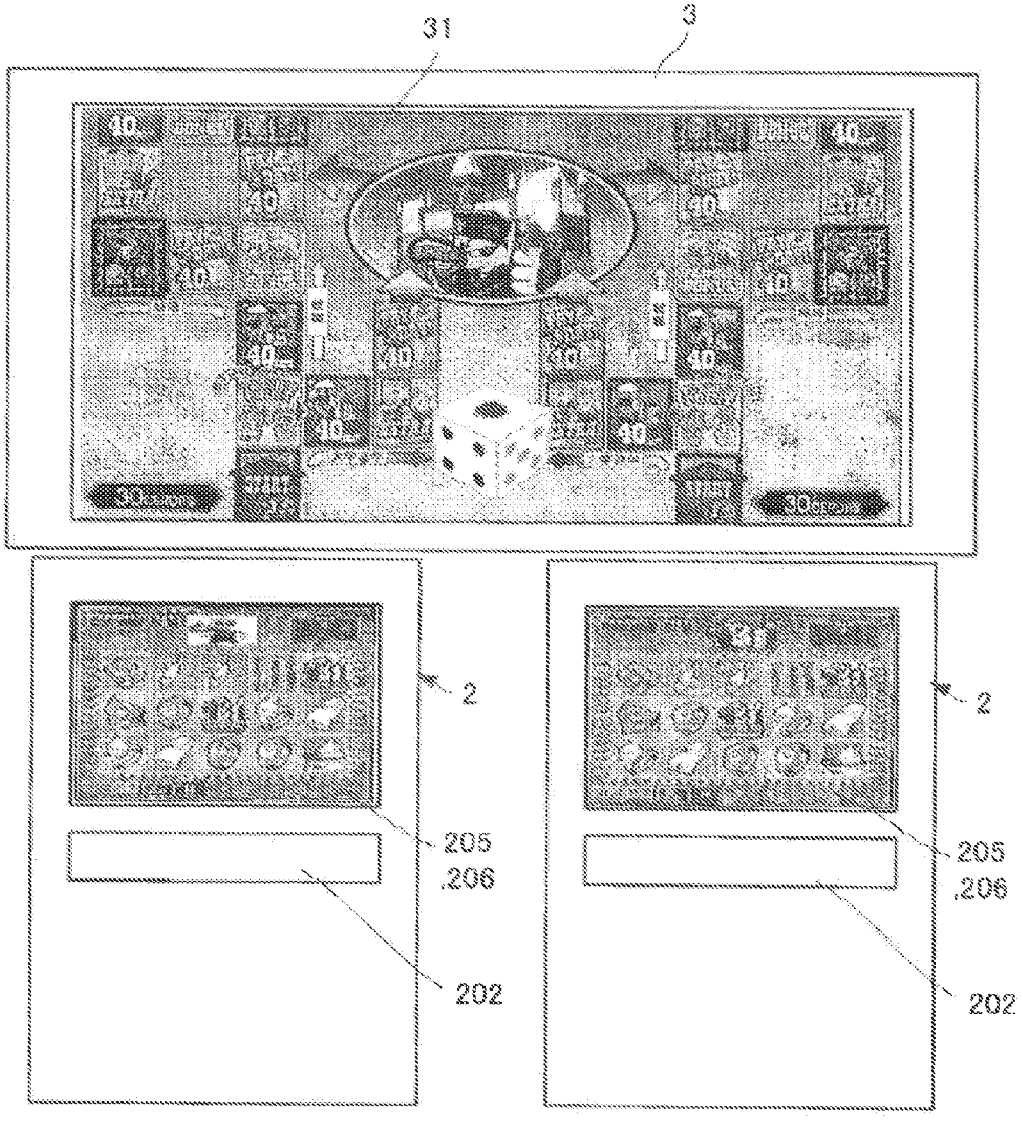
FIG. 5 is a schematic structural front view of a gaming machine.

As shown in FIG. 5, two slot machines 2 are arranged in a parallel state. Above the slot machines 2·2, a common display 3 is provided. The common display 3 comprises a display device such as a liquid crystal display panel, and can display a battle game picture 31. The battle game is, for example, a life game, and a starting position of a game character is set near a top end of each slot machine 2, and a travel route is formed from the starting position to a destination.

The travel route has a plurality of processing units and branch units where the game character travels and stops according to the dice score. The processing unit is set to perform various operations or processing. The branch unit is a unit that divides the travel route into a plurality of parts, for example, the branch direction is determined on the basis of the dice score. Further, the slot machine 2 with the game character first arriving at the destination wins, and the other slot machine 2 loses.

(Dice Device 4)

Figure 6:
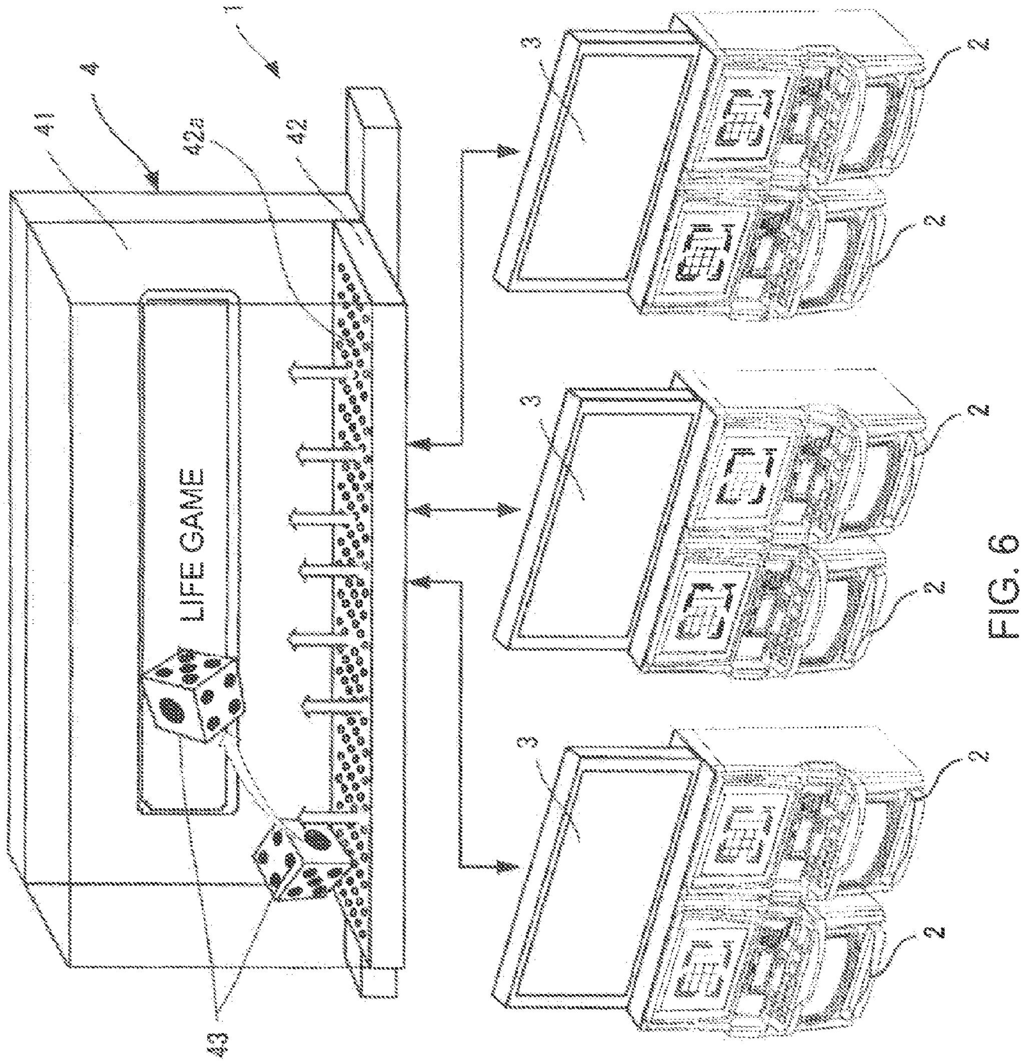
FIG. 6 is a perspective view of a gaming machine.

The score of the dice is randomly determined in the dice device 4. The random determination can also be performed through a program in the computer. As shown in FIG. 6, the dice device 4 is provided at a position that can be seen from both slot machines 2. The dice device 4 includes a dice accommodation body 41 formed of a transparent material, an air jet board 42 provided at a bottom surface of the dice accommodation body 41, and a dice 43 accommodated inside the dice accommodation body 41. A large amount of air jet holes 42*a* are opened on the air jet board 42, and when it is set to randomly determine the dice score, air is jetted within a predetermined time.

Further, the dice 43 is set to such a weight and size that the dice 43 can be cast by the air jetted from the air jet board 42. For example, the dice 43 is formed of foamed styrene. A camera (not shown) for shooting the dice 43 is provided above the dice accommodation body 41. The shooting data of the camera is used for determining the dice score, and the determined dice score is displayed on the common display 3 corresponding to the slot machines 2·2 in the battle game.

(Operation of Slot Machine 2: Basic Game Execution Process)

Figure 8:
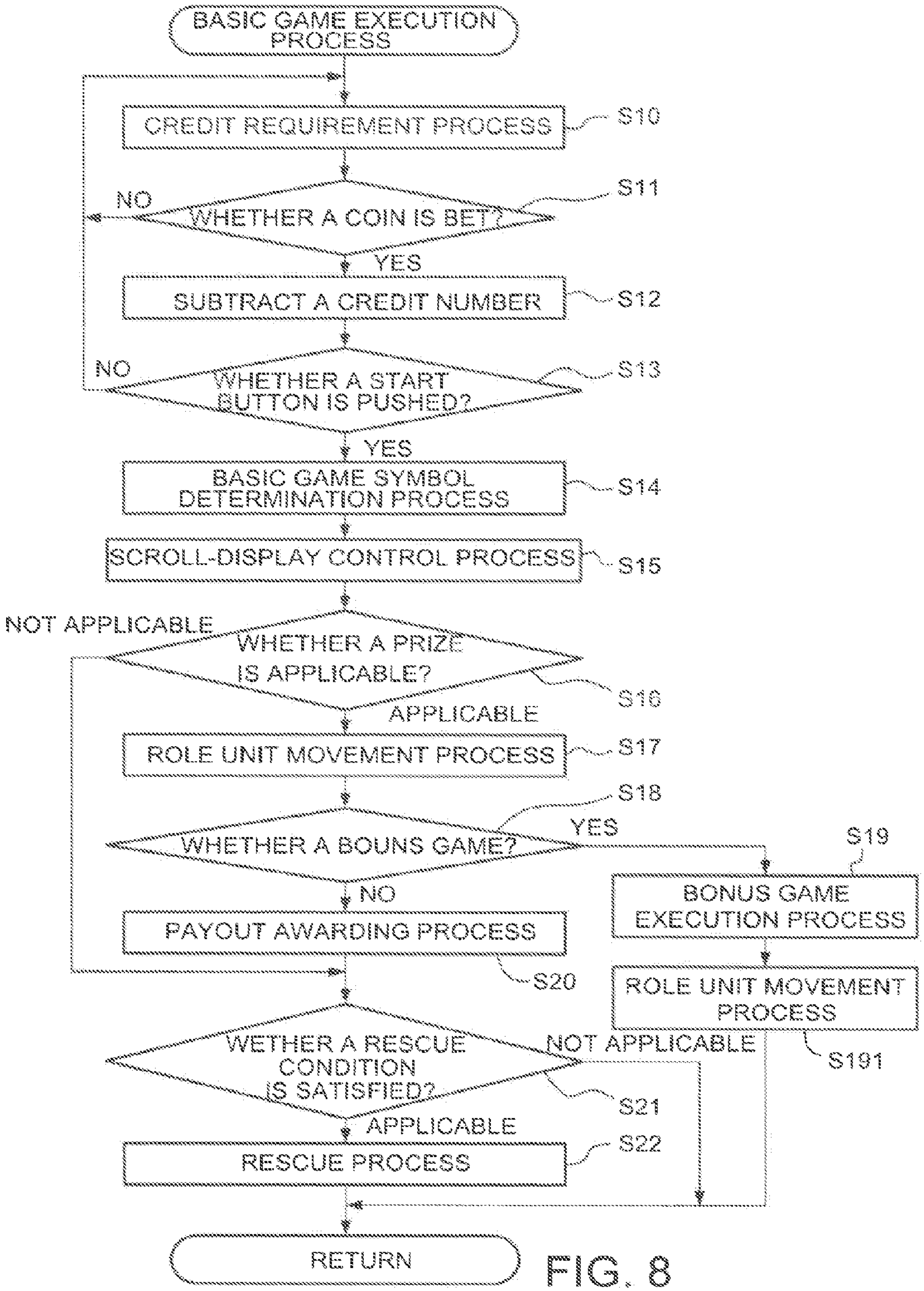
FIG. 8 is a flowchart illustrating an execution process of a basic game.

According to the present invention, if a basic game execution process routine is executed in the terminal controller 21 of the slot machine 2, as shown in FIG. 8, after a credit requirement process is executed (S10), it is determined whether a coin is bet (S11). When the coin is not bet (S11, NO), S10 is re-executed. When the coin is bet (S11, YES), after the credit number is subtracted (S12), it is determined whether a start button is pushed through a push operation (S13).

When the start button is not pushed (S13, NO), S10 is re-executed. When the start button is pushed (S13, YES), a basic game symbol determination process is executed (S14). Subsequently, a scroll-display control process is executed, and after the symbols 101 start scrolling, the display control is implemented (S15) to rearrange the symbols 101 determined in S14.

Next, it is determined whether a prize is applicable (S16). When the prize is not applicable (S16, NO (not applicable)), it is determined whether a rescue condition in which the basic game is repeated for more than a predetermined number of times is satisfied (S21). When the rescue start condition is not satisfied (S21, NO (not satisfied)), the routine is ended. When the rescue start condition is satisfied (S21, YES (satisfied)), a rescue process of awarding a predetermined payout is performed (S22), and then the routine is ended.

Further, when the prize is applicable in S16 (S16, YES (applicable)), a role unit movement process is executed under the control of movement control unit 55 (S17). The role unit movement process activates the movement of the role unit 5 in predetermined movement pattern according to the game result. In some embodiments, in the role unit movement process it is determined whether the triggering condition is satisfied. When the triggering condition is satisfied, the movement of the role unit 5 is activated in predetermined movement pattern according to the game result and then the role unit movement process ends, otherwise the role unit movement process ends without triggering the movement of the role unit 5. In S18 it is determined whether the prize is a bonus game (S18). When the prize is a bonus game (S18, YES), a bonus game execution process is executed, so the process is shifted from the basic game to the bonus game (S19). The role unit movement process is executed during the bonus game execution process (S191). The process is executed in the same manner as in S17. Subsequently, when the bonus game is ended, the routine is ended. When the prize is not a bonus game (S18, NO), a payout awarding process is executed, so a payout corresponding to the prize is awarded (S20). Next, it is determined whether a rescue condition is satisfied (S21), and if the rescue condition is satisfied (S21, YES), the rescue process is executed (S22), and then the routine is ended.

(Battle Game Condition Determination Process)

Figure 9:
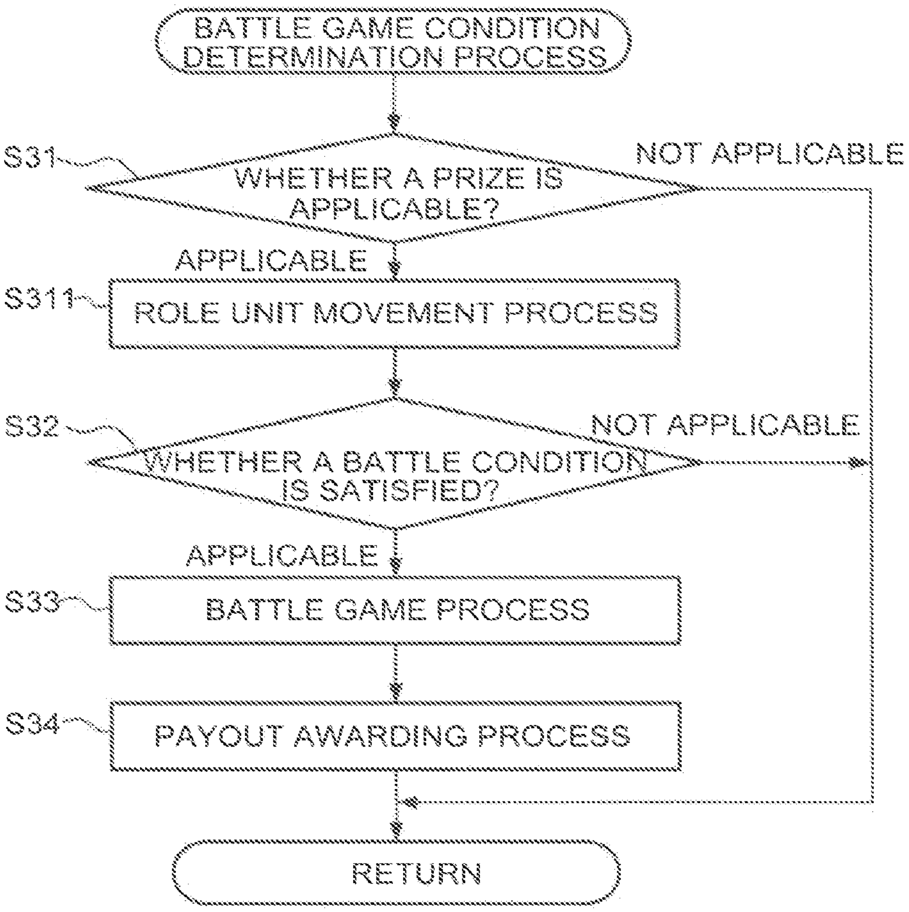
FIG. 9 is a flowchart illustrating a battle game condition determination process.

When the basic game execution process is executed in the above manners, as shown in FIG. 9, a battle game determination process is executed in a separate and parallel manner. In the battle game condition determination process, it is determined whether a prize is applicable in the basic game process (S31). If the prize is not applicable (S32, NO (not applicable)), the routine is ended to repeat S31.

When the prize is applicable (S31, YES (applicable)), the role unit movement process is executed under the control of movement control unit 555 (S311). The process is executed in the same manner as in S17. In S32 it is determined whether a battle game condition is satisfied (S32). When the battle game condition is not satisfied (S32, NO (not satisfied)), the routine is ended to repeat S31. When the battle game condition is satisfied (S32, YES (satisfied)), a battle game process is executed (S33). Further, a payout awarding process is executed, so the payout is awarded on the basis of the game result in the battle game process (S34), and then the routine is ended.

(Battle Game Process)

Figure 10:
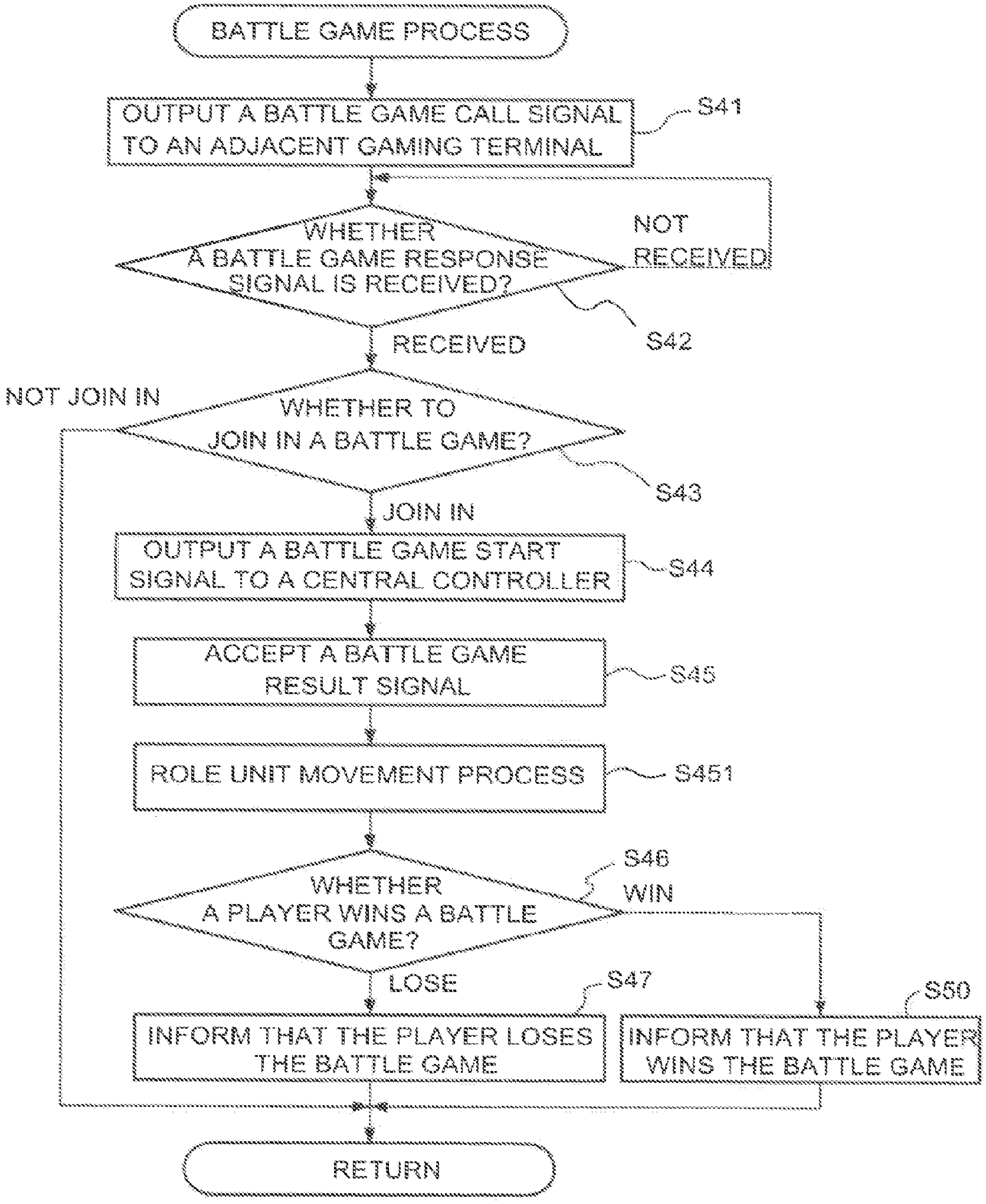
FIG. 10 is a flowchart illustrating a battle game process.

In the battle game condition determination process, if the battle game process is executed (S33), as shown in FIG. 10, first, a battle game call signal is outputted to the adjacent gaming terminal, i.e., the slot machine 2 (S41). Subsequently, it is determined whether a battle game response signal is received (S42), and if the battle game response signal is not received (S42, NO (not received)), S42 is repeated. When the battle game response signal is received (S42, YES (received)), whether to join in the battle game is determined on the basis of the battle game response signal (S43).

When data representing "join battle" is not included in the battle game response signal (S43, NO (not join)), the routine is ended. In addition, when the battle game cannot be executed through the adjacent slot machines 2·2, a battle program in the central controller 6 can be selected as a battle opponent automatically or by a player to execute the battle game.

In contrast, when the data representing "join battle" is included in the battle game response signal (S44, YES (join)), a battle game start signal is outputted to the central controller 6 (S44). Accordingly, a server side battle game process is executed through the central controller 6, and the battle game (life game) is executed between the adjacent slot machines 2·2. Subsequently, when the battle game is ended, a battle game result signal is outputted to the two slot machines 2·2 from the central controller 6.

During the execution of the battle game, the battle game result signal transmitted by the central controller 6 is accepted (S45). If the battle game result signal is received, the role unit movement process is executed under the control of movement control unit 555 (S451). The process is executed in the same manner as in S17. In S46 it is determined whether a player wins the battle game (S46) on the basis of the battle game result data included in the received battle game result signal. When a player loses the battle game (S46), the player is informed that he/she loses through image display, voice output, and light output (S47), and the routine is ended.

(Battle Game Response Process)

Figure 11:
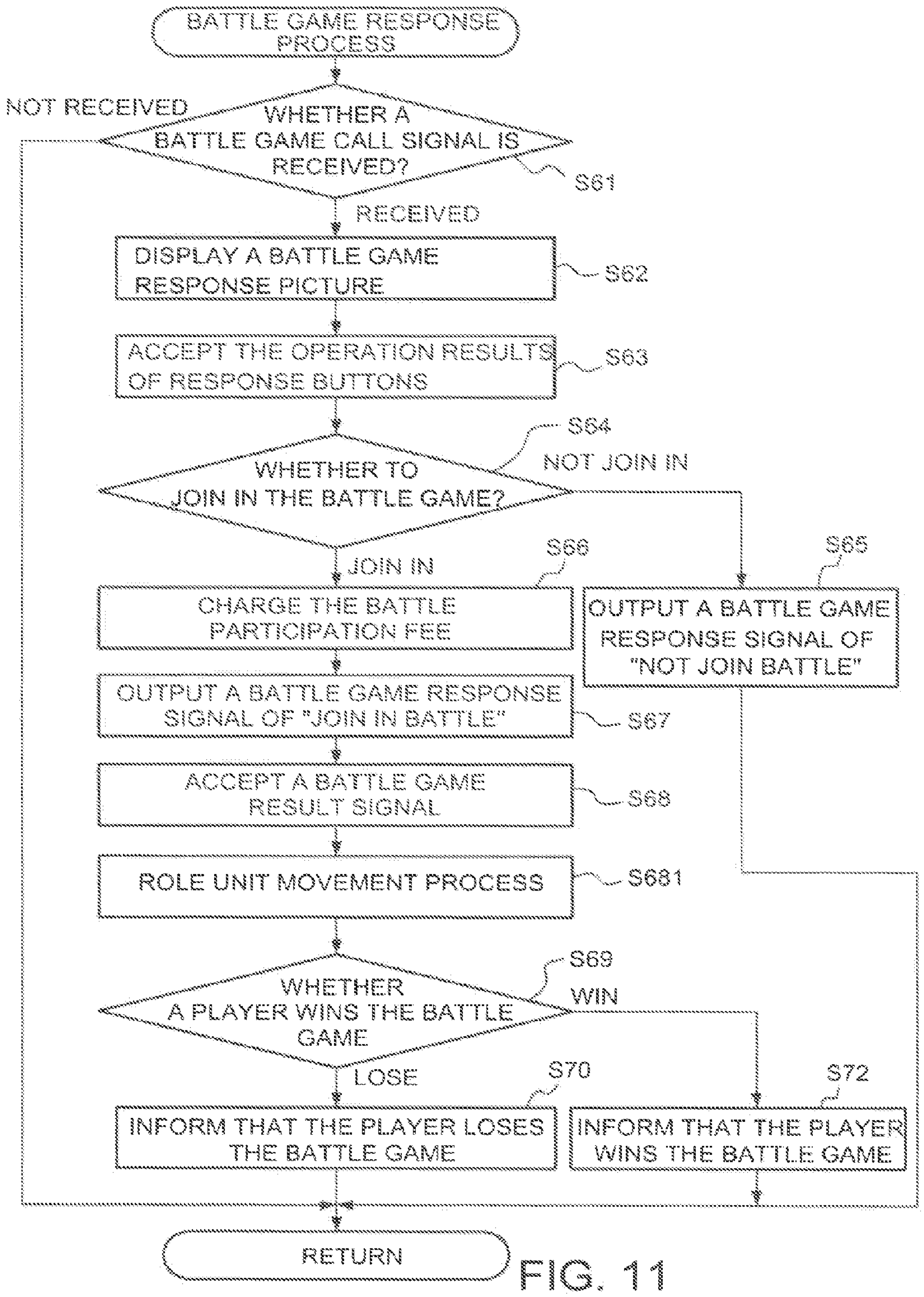
FIG. 11 is a flowchart illustrating a battle game response process.

The terminal controller 21, as shown in FIG. 11, executes a battle game response process and the battle game process in a separate and parallel manner. First, it is determined whether a battle game call signal is received (S61), and when the battle game call signal is not received (S61, NO (not received)), the routine is ended to enter a state of waiting for the battle game call signal in S61.

Figure 7:
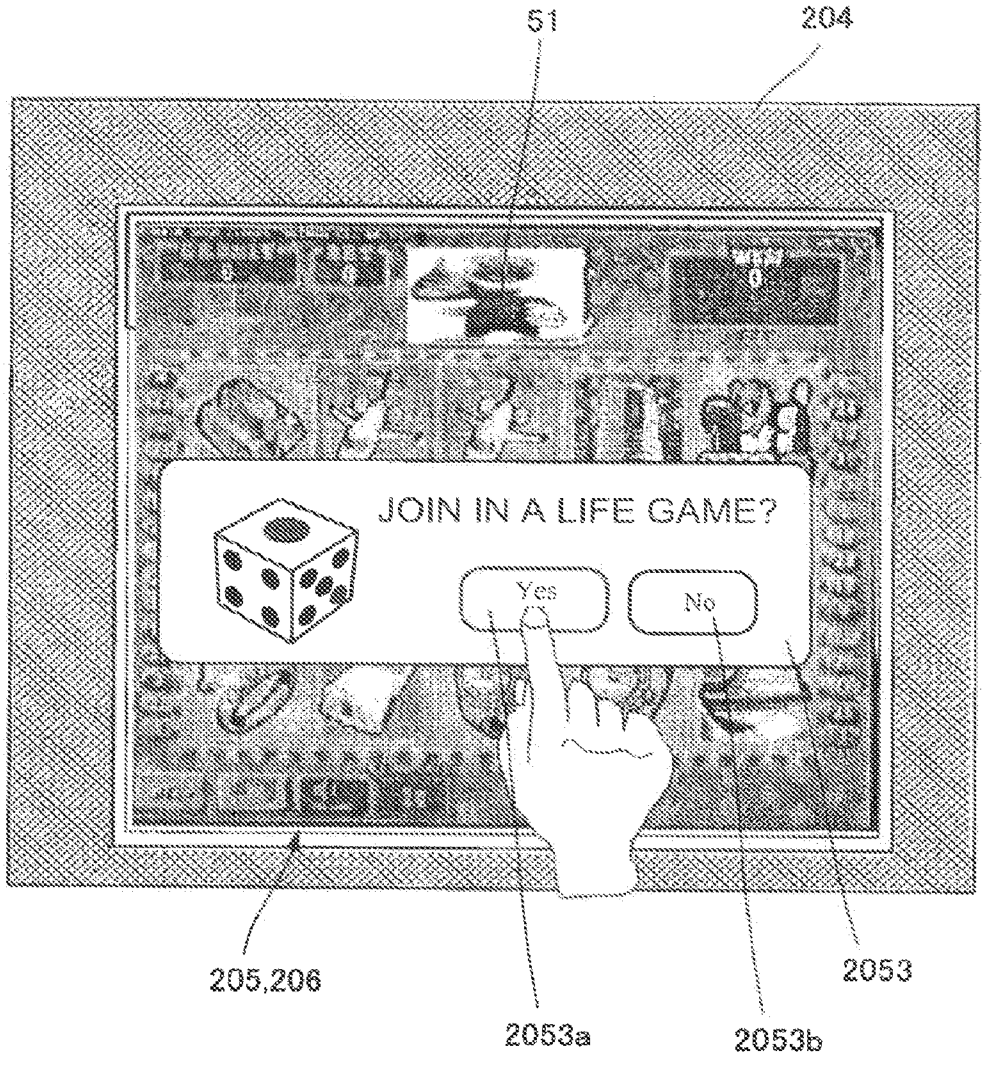
FIG. 7 is a schematic view of a battle game response picture.

In contrast, when the battle game call signal is received (S61, YES (received)), as shown in FIG. 7, a battle game response picture 2053 having "YES" and "NO" response buttons 2053*a*·2053*b* is displayed (S62). Subsequently, an operation acceptance state of the response buttons 2053*a*·2053*b* is entered, and accordingly a standby state is entered, until the response buttons 2053*a*·2053*b* are pushed by the player (S63).

If the response buttons 2053*a*·2053*b* are pushed, it is determined whether the player is joining the battle game (S64). When it is determined that the player is not joining the battle game as the "NO" response button 2053*b* (S64, NO (not join)) is pushed, the battle game response signal of "not join battle" is outputted to the adjacent slot machine 2 (S65). Subsequently, the routine is ended.

When it is determined that the player is joining the battle game as the "YES" response button 2053*a* (S64, YES (join)) is pushed, the battle participation fee (S66) is charged. Subsequently, the battle game response signal of "join battle" is outputted to the adjacent slot machine 2 (S67). Accordingly, the battle game is started on the adjacent slot machines 2·2.

Next, the battle game result signal is accepted (S68). The role unit movement process is executed under the control of movement control unit 555 (S681). The process is executed in the same manner as in S17. If the battle game result signal from the central controller 6 is received as the battle game is ended, it is determined whether the player wins the battle game on the basis of the battle game result signal (S69). If the player does not win the battle game (S69, NO (not win)), the player is informed that he/she loses (S70), and the routine is ended.

In contrast, when the player wins the battle game (S69, YES (win)), the player is informed that he/she wins (S72), and the routine is ended.

(Server Side Battle Game Process)

Figure 12:
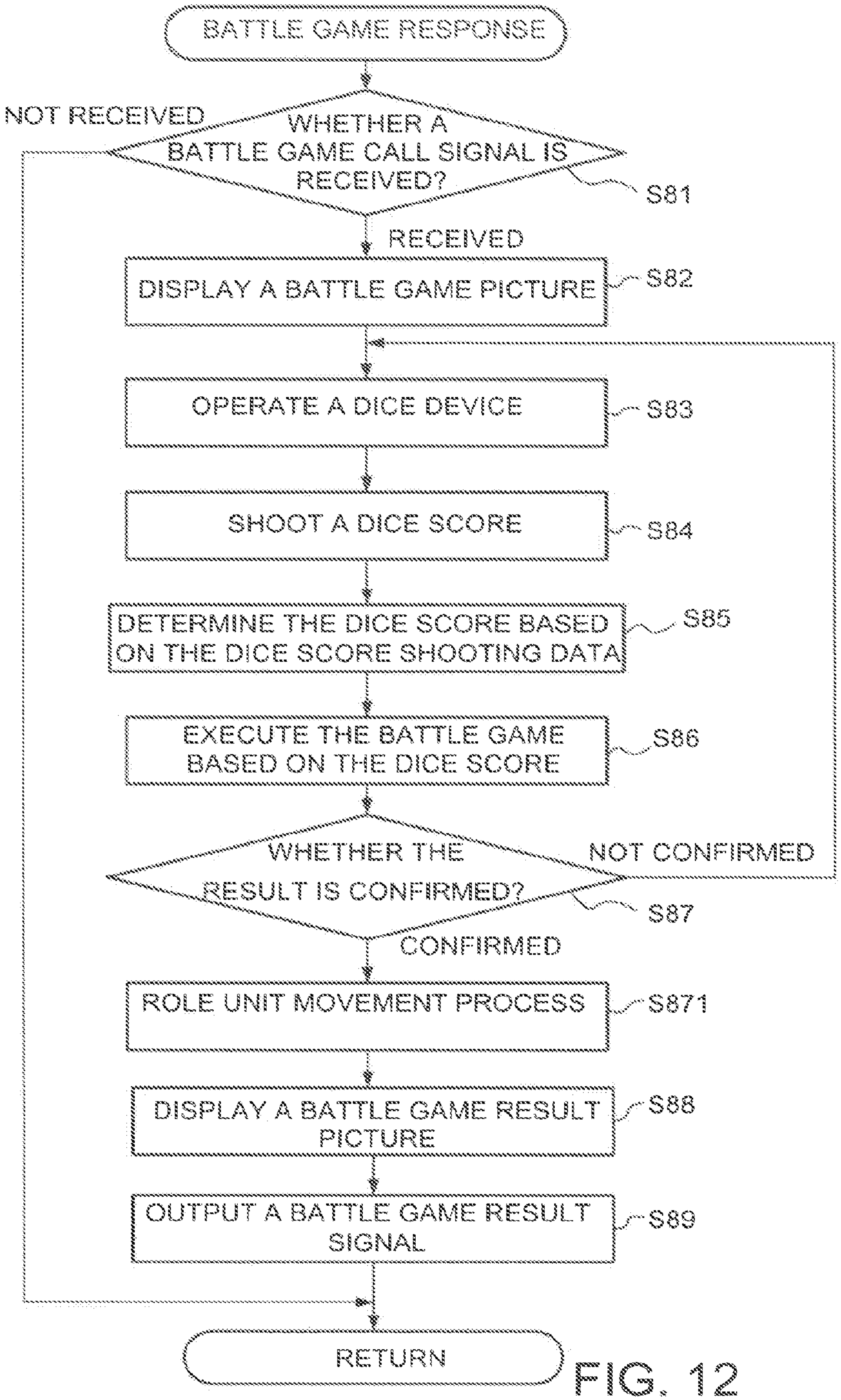
FIG. 12 is a flowchart illustrating a server side battle game process.

Further, in the central controller 6, as shown in FIG. 12, the server side battle game process is executed. First, it is determined whether the battle game start signal is received (S81). If the battle game start signal is not received (S81, NO (not received)), the routine is ended to enter an acceptance state of the battle game start signal due to re-execution of S81.

When the battle game start signal is received, a battle game picture is displayed in the common display 3 (S82). Next, by operating the dice device 4, the dice 43 in the dice device 4 is randomly rolled (S83). In the rolling process and the stopping process of the dice 43, the dice 43 is shot, and the dice score shooting data is outputted (S84). Based on the dice score shooting data when the dice 43 stops, the dice score is determined (S85). The battle game is executed on the basis of the dice score (S86).

Next, it is determined whether the result of the battle game is confirmed (S87). If the result is not confirmed (S87, NO (not confirmed)), S83 is re-executed. When the result is confirmed (S87, YES (confirmed)), the role unit movement process is executed under the control of movement control unit 555 (S871) in the same manner as in S17 and a battle game result picture showing which one of the slot machines 2.2 wins is displayed (S88). Next, the battle game result signal is outputted (S89), and the routine is ended.

Although the embodiment of the present invention is illustrated, the embodiment is only exemplary, and not intended to limit the present invention, and changes can be made to the specific structures of various measures. Specifically, in this embodiment, as shown in FIG. 1, 2 slot machines 2·2 arranged in parallel and a common display 3 for the slot machines 2·2 are included, and the present invention is structured to execute the battle game between the adjacent slot machines 2·2; however, the present invention is not limited thereto.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

LIST OF REFERENCE NUMERALS

1 Gaming machine
2 Slot machine
3 Common display
4 Dice device
5 Role unit
6 Central controller
21 Terminal controller

What is claimed is:

1. A slot machine having a symbol display device and on which a base game is executed by rearranging symbols on the symbol display device, with the slot machine being configured to award an award amount corresponding to the rearranged symbols, the slot machine comprising:

a game result determination unit, which determines positions of the rearranged symbols as a base game result;

a game execution unit, which executes the base game in a manner to reach the base game result;

a moveable component disposed at a position where, as well as the symbols displayed in the symbol display device, the moveable component is visible from outside of the slot machine, the moveable component being capable of mechanical movement in a plurality of movement patterns that are determined according to the base game result, with the mechanical movement being ancillary or supplemental to execution of the base game; and a movement control unit, which is programmed to control the mechanical movement of the moveable component, wherein the movement control unit causes the moveable component to move, during the process of executing the base game, in a predetermined movement pattern corresponding to or indicative of the base game result that is to be reached.

2. A slot machine apparatus, comprising:

a central controller;

a plurality of slot machines according to claim 1, each of which is connected to the central controller in data-transmitting communication therewith, and a common display provided above the plurality of slot machines;

wherein when a battle game is triggered during execution of a base game on one of the plurality of slot machines, 1) the central controller executes the battle game after the base game is concluded on said one of the plurality of slot machines; and 2) the game execution unit on said one of the plurality of slot machines causes a battle game image to be displayed on the common display.

3. A gaming machine, comprising:

a game result determination unit, which determines a game result;

a game execution unit, which executes a game in a manner to reach the game result;

a moveable component disposed at a position that is visible from outside the gaming machine, the moveable component being capable of mechanical movement that is ancillary or supplemental to execution of the game and that corresponds to the game result that is to be reached; and a movement control unit which, during the process of executing the game, controls the mechanical movement of the moveable component, wherein the movement control unit is programmed to cause the moveable component to move, during execution of the game, in a predetermined movement pattern corresponding to or indicative of the game result that is to be reached.

4. A method for controlling execution of a game on a slot machine, comprising rearranging symbols on a symbol display device; and awarding of an award amount corresponding to the rearranged symbols, the game control method comprising:

determining a position of the rearranged symbols as a game result;

executing the game by causing the symbols to move in a manner to reach the game result; and during the process of executing the game, causing a moveable component other than the symbols to move in one of a plurality of distinguishable or discernible, predetermined movement patterns, other than movement of the symbols, that foretells or presages the game result that is to be reached.

* * * * *